US012554593B2

(12) United States Patent
Nettem et al.

(10) Patent No.: US 12,554,593 B2
(45) Date of Patent: Feb. 17, 2026

(54) TECHNIQUES TO ENHANCE FAILURE TOLERANCE DURING FILE SYNCHRONIZATION

(71) Applicant: Rubrik, Inc., Palo Alto, CA (US)

(72) Inventors: Chaitanya Choudhary Nettem, Bengaluru (IN); Sarat Varma Kallepalli, Bengaluru (IN); Vaiapuri Ramasubramaniam, Bengaluru (IN); Amit Kundlia, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/733,162

(22) Filed: Jun. 4, 2024

(65) Prior Publication Data

US 2025/0370883 A1     Dec. 4, 2025

(51) Int. Cl.
*G06F 11/00*     (2006.01)
*G06F 11/1446*     (2026.01)

(52) U.S. Cl.
CPC ...... *G06F 11/1464* (2013.01); *G06F 11/1469* (2013.01)

(58) Field of Classification Search
CPC . G06F 11/1464; G06F 11/1469; G06F 11/079
See application file for complete search history.

(56) References Cited

U.S. PATENT DOCUMENTS

| | | | | |
|---|---|---|---|---|
| 8,938,641 B2* | 1/2015 | Veal | ............... | G06F 11/1474 714/6.24 |
| 2014/0310483 A1* | 10/2014 | Bennett | ............... | G06F 3/064 711/154 |
| 2015/0205669 A1* | 7/2015 | Sundaram | ........... | G06F 11/1092 714/6.23 |
| 2015/0220398 A1* | 8/2015 | Schirripa | ............ | G06F 11/1469 707/675 |
| 2016/0092444 A1* | 3/2016 | Dornquast | .......... | G06F 11/1464 707/610 |
| 2023/0376386 A1* | 11/2023 | Kochar | ................ | G06F 16/27 |
| 2024/0248605 A1* | 7/2024 | Wang | ................ | G06F 3/0652 |
| 2024/0311259 A1* | 9/2024 | Karthik | ............. | G06F 11/1469 |
| 2024/0338382 A1* | 10/2024 | Upadhyay | ......... | G06F 16/24568 |
| 2025/0110834 A1* | 4/2025 | Karuppur Rajagopalan | | ............... G06F 11/1451 |

* cited by examiner

*Primary Examiner* — Jonathan D Gibson
(74) *Attorney, Agent, or Firm* — Holland & Hart LLP

(57) ABSTRACT

Methods, systems, and devices for data management are described. A data management system (DMS) may receive a synchronization request to back up a set of files from a source database to a target database including a set of nodes. In some cases, each node of the target database may support storage of a set of data stripes, and a data stripe may include a logical subdivision of a file. The DMS may back up the set of files to the target database. The DMS may determine that a most recent data wedge is incompletely filled at a time corresponding to receiving the synchronization request, where a data wedge represents a cross section of data across multiple data chunks of a corresponding data stripe. The DMS may then generate a file including an indication of one or more data stripes corresponding to the set of files.

20 Claims, 11 Drawing Sheets

TECHNIQUES TO ENHANCE FAILURE TOLERANCE DURING FILE SYNCHRONIZATION

FIELD OF TECHNOLOGY

The present disclosure relates generally to data management, including techniques for techniques to enhance failure tolerance during file synchronization.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A data management system (DMS) may regularly back up data from a source data environment to a target data environment. The DMS may store the data using a logical subdivision of files to guarantee failure tolerance. In particular, when backing up, the DMS may write the data in "data stripes" within several data chunks. A data stripe may represent a logical subdivision of a file and a data chunk may represent physical files on disk for backing up a data stripe. The data may be stored in horizontal stripes, where each data stripe has 4 data chunks and 2 code chunks. A horizontal cross section across data chunks including 4 "slices" may be referred to as a "data wedge." A data wedge, in this example, may be 512 KB in length (4 data chunks*128 KB). The DMS may write data in slices and may compute a code chunk slice for a data wedge when it is full. However, one challenge when computing code chunk slices is that the DMS may compute code chunks (for failure tolerance) when a data wedge is complete. In some instances, if data backed up in data chunks does not complete a data wedge, then that data may be open to potential failure, because, the DMS may not compute code chunk slices for partial data wedges. This may lead to suboptimal performance when backing up files and may have a negative impact on customer experience.

One or more aspects of the present disclosure provide for techniques enhancing failure tolerance on-demand (e.g., when an application performs a synchronization) in an encoded file while maintaining an append-only variant. To enhance failure tolerance, the DMS may maintain a wedge file for partial wedges. The DMS may maintain copies of a partial wedge in these wedge files upon receiving a synchronization request. For instance, the DMS may back up a set of files to a target database based on storing the set of data stripes in a set of data chunks. In some cases, the data stripe may include one or more data chunks stored in each node of the set of nodes. In some cases, a data wedge may represent a cross section of data across multiple data chunks of a corresponding data stripe. The data wedge files may be co-located with code chunks. That is, there may be one wedge file in the same node and disk as each code chunk. The DMS may maintain an append-only invariant for each wedge file. In this example, each data wedge may correspond to a new wedge file. For instance, the DMS may receive data for backing up, and may subsequently write the data in data slices. After the data is written, the DMS may receive a synchronization request from a customer. The DMS may determine that a latest wedge is not filled and accordingly generates a wedge file. In order to recover or reconstruct a data chunk from a code chunk, the DMS may use the wedge file in addition to the code chunks.

Figure 1:
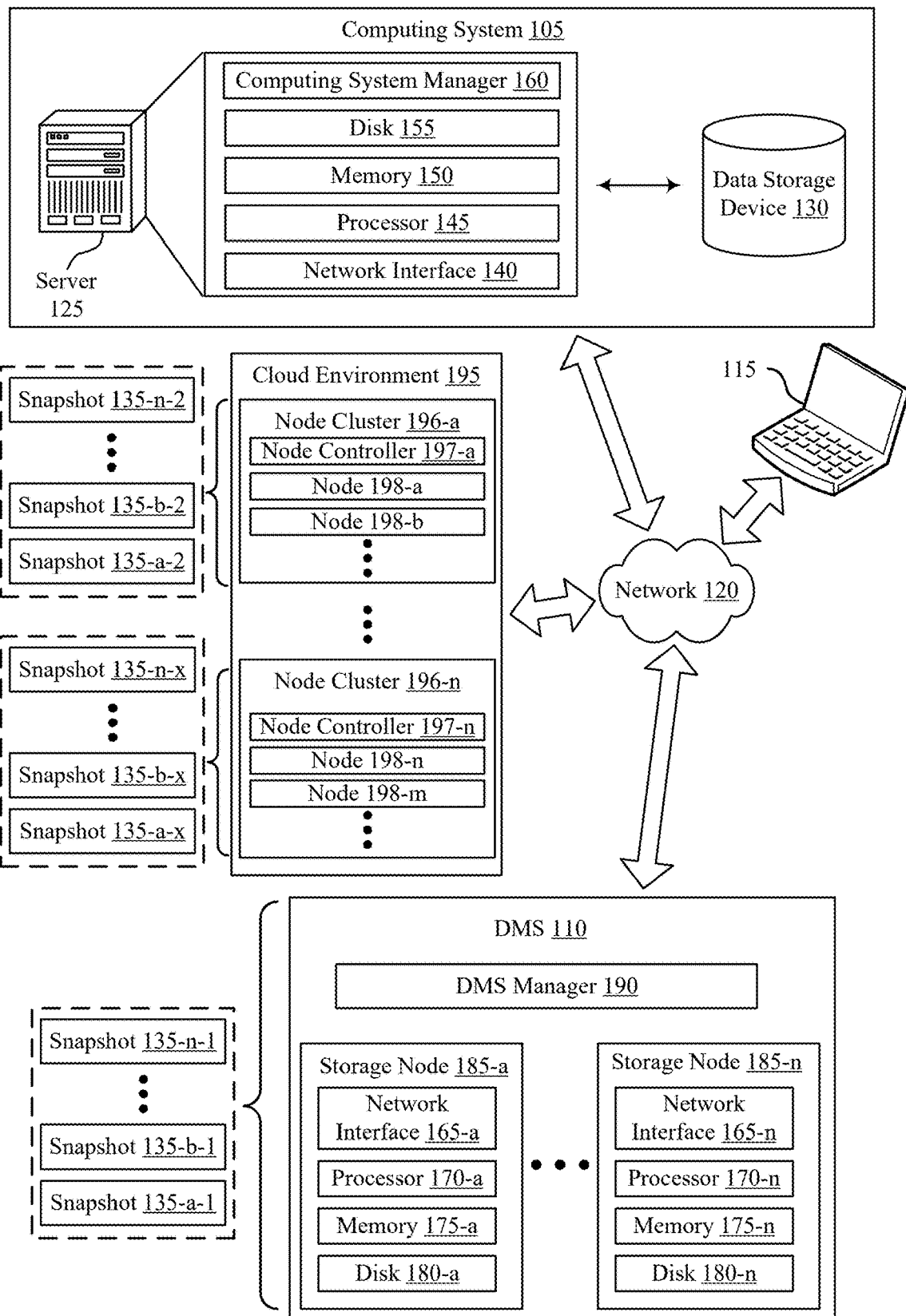
FIG. 1 illustrates an example of a computing environment that supports techniques to enhance failure tolerance during file synchronization in accordance with aspects of the present disclosure.

FIG. 1 illustrates an example of a computing environment 100 that supports techniques to enhance failure tolerance during file synchronization in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described herein.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, the DMS 110 in combination with the computing system 105 may receive a synchronization request to back up a set of files from a source database to a target database including a set of nodes, where each node of the set of nodes of the target database supports storage of a set of data stripes. In some cases, a data stripe of the set of data stripes may include a logical subdivision of a file from the set of files. The DMS 110 may back up the set of files to the target database based on storing the set of data stripes in a set of data chunks. In some examples, the data stripe may include one or more data chunks stored in each node of the set of nodes, and a data wedge may represent a cross section of data across multiple data chunks of a corresponding data stripe. The DMS 110 may determine that a most recent data wedge is incompletely filled at a time corresponding to receiving the synchronization request. The DMS 110 may then generate a file including an indication of one or more data stripes corresponding to the set of files based on determining that the most recent data wedge is incompletely filled at the time corresponding to receiving the synchronization request.

Figure 2:
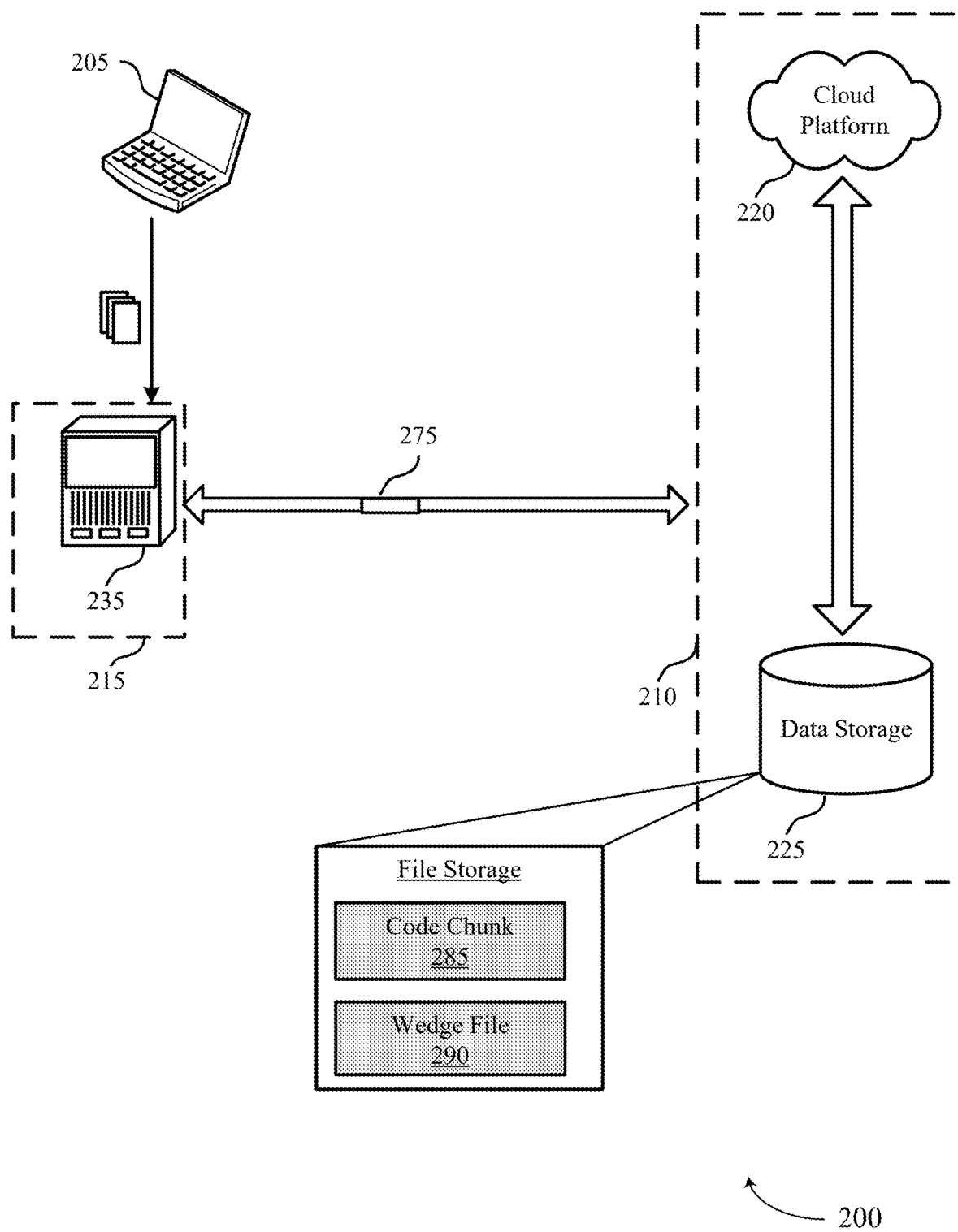
FIG. 2 shows an example of a computing system that supports techniques to enhance failure tolerance during file synchronization in accordance with aspects of the present disclosure.

FIG. 2 shows an example of a computing system 200 that supports techniques to enhance failure tolerance during file synchronization in accordance with aspects of the present disclosure. The computing system 200 includes a user device 205, a DMS 210 and a data manager 215. The DMS 210 may be or include a data storage infrastructure. The user device 205 may be an example of a device described with reference to FIG. 1. The user device 205 may also be an example of a cloud client. A cloud client may access data sources using a network connection. The network may implement transfer control protocol and internet protocol (TCP/IP), such as the Internet, or may implement other network protocols. The user device 205 may be an example of a user device, such as a server, a smartphone, or a laptop. In other examples, a user device 205 may be a desktop computer, a tablet, a sensor, or another computing device or system capable of generating, analyzing, transmitting, or receiving communications. In some examples, the user device 205 may be operated by a user that is part of a business, an enterprise, a non-profit, a startup, or any other organization type.

The DMS 210 may include a data storage 225 (e.g., a storage node or a distributed storage node). Although not depicted herein, the DMS 210 may include more than one data storage 225. Multiple data storages 225 (e.g., storage nodes of a distributed storage architecture) may be geographically separated from each other. As depicted in the example of FIG. 2, the DMS 210 may include a cloud platform 220. The cloud platform 220 may offer an on-demand storage and computing services to the user device 205. In some cases, the DMS 210 may be an example of a storage system with built-in data management. The DMS 210 may serve multiple users with a single instance of software. However, other types of systems may be implemented, including—but not limited to—client-server systems, mobile device systems, and mobile network systems. The data manager 215 may be an example of an integrated data management and storage system. The data manager 215 may include an application server 235. The application server 235 may represent a unified storage system even though numerous storage nodes may be connected together and the number of connected storage nodes may change over time as storage nodes are added or removed. The data manager 215 may also be an example of a cloud-based storage and an on-demand computing platform.

As depicted herein, the computing system 200 may support an integrated data management and storage system and may be configured to manage the automated storage, backup, deduplication, replication, recovery, and archival of data within and across physical and virtual computing environments. The computing system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the computing system 200 may provide backup of data (e.g., one or more files) using parallelized workloads, where the data may reside on virtual machines and/or real machines (e.g., a hardware server, a laptop, a tablet computer, a smartphone, or a mobile computing device).

According to aspects depicted herein, the computing system 200 may support a large number of databases running on clustered setups. In some examples, such databases may have instances running across multiple nodes of a cluster (e.g., DMS 210 including a computing cluster). The computing system 200 may support a target database including a set of nodes, where each node of the set of nodes of the target database supports storage of a set of data stripes. In some cases, a data stripe of the set of data stripes may include a logical subdivision of a file. In some cases, the computing system 200 may face challenges related storing data files in a target database including a set of data stripes. Aspects depicted herein provide for improved file storage on computing systems using a technique for enhanced failure tolerance during file synchronization.

According to one or more aspects of the present disclosure, the data manager 215 may receive a set of files for backing up at the DMS 210. Additionally, the data manager 215 may receive a synchronization request to back up a set of files 275 from a source database to a target database hosted at the DMS 210. The target database (e.g., data storage 225 or cloud platform 220 or both) may include a set of nodes, where each node of the set of nodes of the target database supports storage of a set of data stripes. In some cases, a data stripe of the set of data stripes may include a logical subdivision of a file from the set of files. Additionally, or alternatively, a data chunk may refer to physical files on a disk backing a stripe. For an encoding process (e.g., Reed Solomon), each chunk may be 32 MB in length. Each Reed Solomon stripe may include 4 data chunks and 2 code chunks.

In some examples, the chunk files included in the code chunk 285 may include append-only invariants. The code chunk 285 may be included in data storage 225. The append-only invariant may be used by the computing system 200 to ensure that files once written and finalized, are not available for being edited. A data slice may refer to data chunks that are subdivided into 128 KB slices. In some examples, the data manager 215 may first write the first data slice for each data chunk. Then the data manager 215 may first write the second data slice for each data chunk, and so on. In some examples, a data wedge may refer to a horizontal cross section across data chunks including 4 data slices. A data wedge, in one example, may be 512 KB in length (4 chunks*128 KB).

Upon receiving the synchronization request, the data manager 215 in combination with the DMS 210 may back up the set of files to the target database based on storing the set of data stripes in a set of data chunks. As depicted herein, the data stripe includes one or more data chunks stored in each node of the set of nodes, and a data wedge represents a cross section of data across multiple data chunks of a corresponding data stripe. In some examples, the data manager 215 may compute code slices for a data wedge based on determining that the data wedge is full. The DMS 210 may also implement Reed Solomon encoding for data transformation which may add redundant data ("code slices" in Reed Solomon stripes) to a given message (data slices), thereby enabling recovery of the original information if parts of it gets lost or corrupted. For instance, if any two slices in a wedge are lost, the computing system 200 may implement the techniques depicted herein to recompute the lost information using the remaining two data slices and the two code slices. In some cases, chunk files may be allocated to nodes and disks using an allocation algorithm which ensures one node and two disk failure tolerance. As depicted herein, the DMS 210 may store the data in accordance with "reed solomon stripes," where each "reed solomon" stripe is 128 MB in length (e.g., all "reed solomon" encoded files are divided into 128 MB data stripes in a file system).

As depicted herein, upon receiving a synchronization request, the DMS 210 in combination with data manager 215 may write the data in data wedge. If a data wedge is complete, then the DMS 210 may generate a code chunk 285 corresponding to the completed data wedge. In some examples, the DMS 210 may determine that a most recent data wedge is incompletely filled at a time corresponding to receiving the synchronization request. In such cases, to enhance the failure tolerance, the DMS 210 may generate a wedge file based on determining that the most recent data wedge is incompletely filled at the time corresponding to receiving the synchronization request. The wedge file may be a file including an indication of one or more data stripes corresponding to the set of files. As described in the example of FIG. 2, the DMS 210 may generate the wedge file 290. In some examples, the wedge file 290 may be included in data storage 225. The wedge file 290 may be co-located with the code chunk 285. In some cases, the DMS 210 may generate a second wedge file including the indication of the one or more data stripes corresponding to the set of files based on determining that the most recent data wedge is incompletely filled at a time corresponding to receiving the synchronization request.

In some examples, each wedge file may be append-only. In some examples, each new data wedge may be associated with a new wedge file contributing to encapsulation and easy management or clean-up of wedge files. The techniques depicted herein may also provide for effective handling of multiple synchronization requests. For each data wedge, in case multiple synchronization requests are received, the DMS 210 may write to wedge files 290 taking into account only the new data written since the previous synchronization request. This method not only upholds the append-only rule, but it may also improve efficiency by avoiding unnecessary leaked space. In some cases, the DMS 210 may avoid computation of code slices for partial data wedges. Computation of code slices is computationally expensive. The techniques discussed herein may avoid this computational cost, thus allowing for more frequent synchronization requests without any processor cost. In some examples, wedges files 290 may be co-located with code chunks 285.

In this way, the DMS 210 may use one or more failure tolerance guarantees provided by a chunk allocation algorithm.

In some examples, when the DMS 210 receives a synchronization request (e.g., at ReedSolomonStripeWriter), the DMS 210 may determine if a current data wedge is partial. In such cases, the DMS 210 may create a copy of an in-memory buffer (which includes the contents of the partial wedge) in the code chunk (in "WriteChunkLoop") and may write it to a corresponding wedge file 290. When creating a copy of the in-memory buffer, the DMS 210 may take into account the offset of the last synchronization if the last synchronization was on the current data wedge. This ensures that the DMS 210 only copies the contents written since the last synchronization. In some cases, the DMS 210 may compute a wedge file path from the code chunk path by adding a wedge file index.

In some examples, the DMS 210 may receive a recovery request after generating the wedge file 290. When the DMS 210 recovers or reconstructs a data chunk from a code chunk, the DMS 210 may use the new wedge file 290, if needed. Given the synchronized file size, if the DMS 210 determines that it has the code slices associated with reconstructing the chunk file included in code chunk 285, then the DMS 210 may perform the reconstruction. If the code chunk 285 does not have all the slices (only the slice for the last wedge is missing in the code chunk), then the DMS 210 may inspect metadata associated with the chunk file to find out the path of the wedge file 290. The DMS 210 may then read the last slice from the wedge file 290 and use that for reconstruction. If the last slice is not found in either chunk file or slice file, then the DMS 210 may report corruption.

In some examples, the reconstruction process may be triggered under a variety of scenarios. These scenarios may include a writing error (e.g., in ReedSolomonStripe Writer), where if the writing job (e.g., WriteChunkLoop) has error writing to the chunk file, then the DMS 210 may attempt to read the chunk and rewrite it to a new chunk file. This may include reconstruction if the old chunk cannot be read. In some examples, the scenario may also include a reading error (e.g., in ReedSolomonChunkReader), where the DMS 210 may reconstruct the chunk if it cannot be read without reconstruction. This may include a generic read path but may also be invoked as a step by other scenarios. In some examples, reconstruct may be accessed by the DMS 210 in recovery scenarios (e.g., recovery flows) such as drain, recovery and rebalance (e.g., in MaintenanceManager). In some cases, if a file has not been accessed for a while, then the DMS 210 may close and finalize any open stripe for the file (auto finalize). During the auto finalize process, the DMS 210 may attempt to rebuild the code chunk if needed and write it to a new chunk file.

Figure 3:
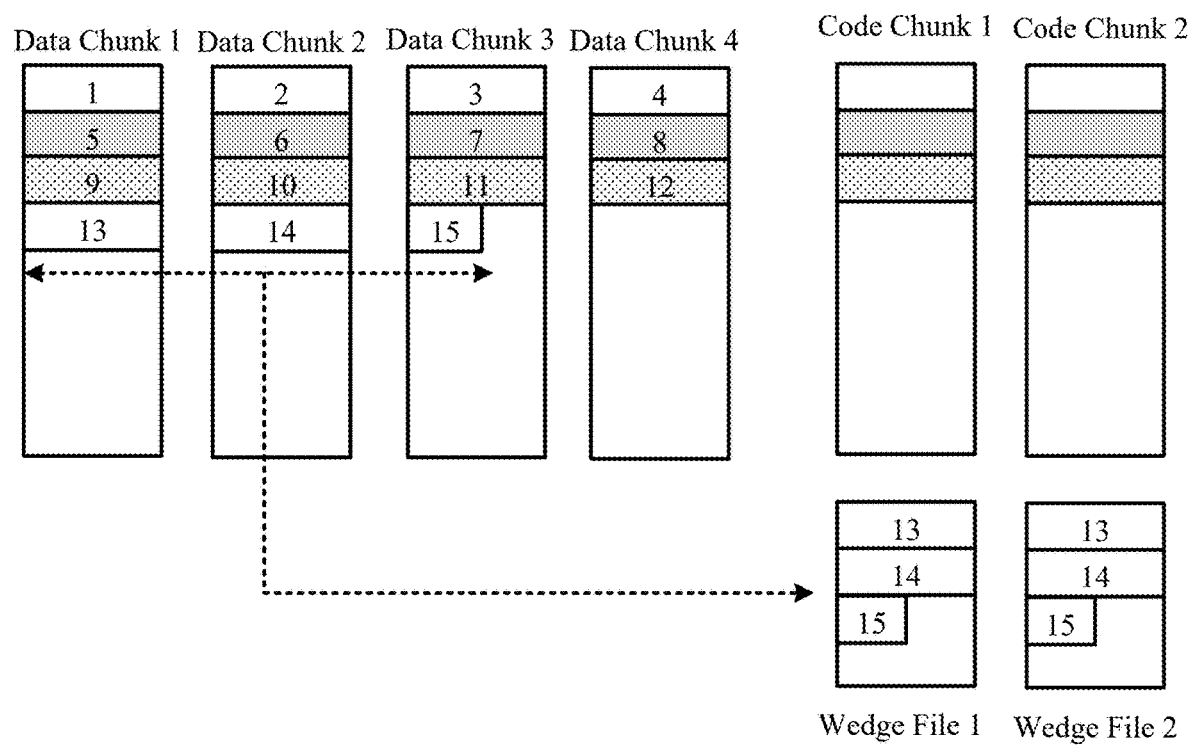
FIG. 3 shows an example of a data storage architecture that supports techniques to enhance failure tolerance during file synchronization in accordance with aspects of the present disclosure.

FIG. 3 shows an example of a data storage architecture 300 that supports techniques to enhance failure tolerance during file synchronization in accordance with aspects of the present disclosure. As depicted herein, one or more files may be backed up in accordance with the data storage architecture 300.

In the example of FIG. 3, the data storage architecture 300 includes four data chunks, with each data chunk including a set of data slices. For example, data chunk 1 includes data slices 1, 5, 9, and 13, data chunk 2 includes data slices 2, 6, 10, and 14, data chunk 3 includes data slices 3, 7, 11, and 15, and data chunk 4 includes data slices 4, 8, and 12. A data wedge represents a cross section of data across multiple data chunks of a corresponding data stripe. As depicted in the example of FIG. 3, data slices 1, 2, 3 and 4 together is referred to as a full data wedge (data wedge 1). Similarly, data slices 5, 6, 7, and 8 together includes data wedge 2 and data slices 9, 10, 11, and 12 together includes data wedge 3. In this example, data slices 13, 14 and 15 is referred to as a partial wedge.

In some examples, once a data wedge is full, the DMS may compute and persist the corresponding code slices (allowing the file system to guarantee one node, 2 disk failure tolerance). For example, one data wedge 1 is complete, the DMS may compute a corresponding code slices stored in code chunks. In some cases, when a code slice is saved in code chunk 1, a copy of the code slice is saved in code chunk 2. In some examples, for partial wedges, the DMS may not compute code slices. This may be because, when the DMS receives more writes to the partial wedge (e.g., data slices written to data chunk 4), it may result in changing of an existing code slice, thereby breaking an append-only invariant for code chunks. To enhance failure tolerance on-demand (for example when an application performs a synchronization) in such encoded file while not breaking the append-only invariant, the techniques depicted herein provide for generation of wedge files for incomplete data wedges.

As depicted in the example of FIG. 3, the DMS may generate wedge file 1 and wedge file 2 including copies of the partial data wedge (data slices 13, 14 and 15, in this example). The DMS may maintain copies of the partial wedge in the wedge files when it receives a synchronization call (or synchronization request) from a customer. The wedge files may be co-located with code chunks. For instance, there may be one wedge file in the same node and disk as each code chunk. The DMS may maintain the append-only invariant for each wedge file. In some examples, each new wedge may be associated with a new wedge file. Within each data wedge, if the DMS receives multiple synchronization requests, to the wedge files, then the DMS may write the new data written since the previous synchronization. In some examples, a wedge file path can be computed deterministically from the code chunk path.

In some cases, the DMS may receive a second synchronization request to back up a second set of files from a source database to a target database. The DMS may determine that the most recent data wedge is completely filled at a time corresponding to receiving the second synchronization request. Although not depicted herein, in this example, the DMS may determine that data wedge 4 is a complete wedge after backing up the second set of files indicated in the second synchronization request. In such cases, the DMS may delete the wedge files 1 and 2 (including indication of data slices 13, 14 and 15) based on determining that the most recent data wedge is completely filled at the time corresponding to receiving the second synchronization request. Thus, the introduction of wedge files provides for ensuring the append-only invariant for chunk files while enhancing the ability to synchronize, Additionally, the techniques depicted herein ensures enhanced failure tolerance on-demand for partial data wedges.

Figure 4:
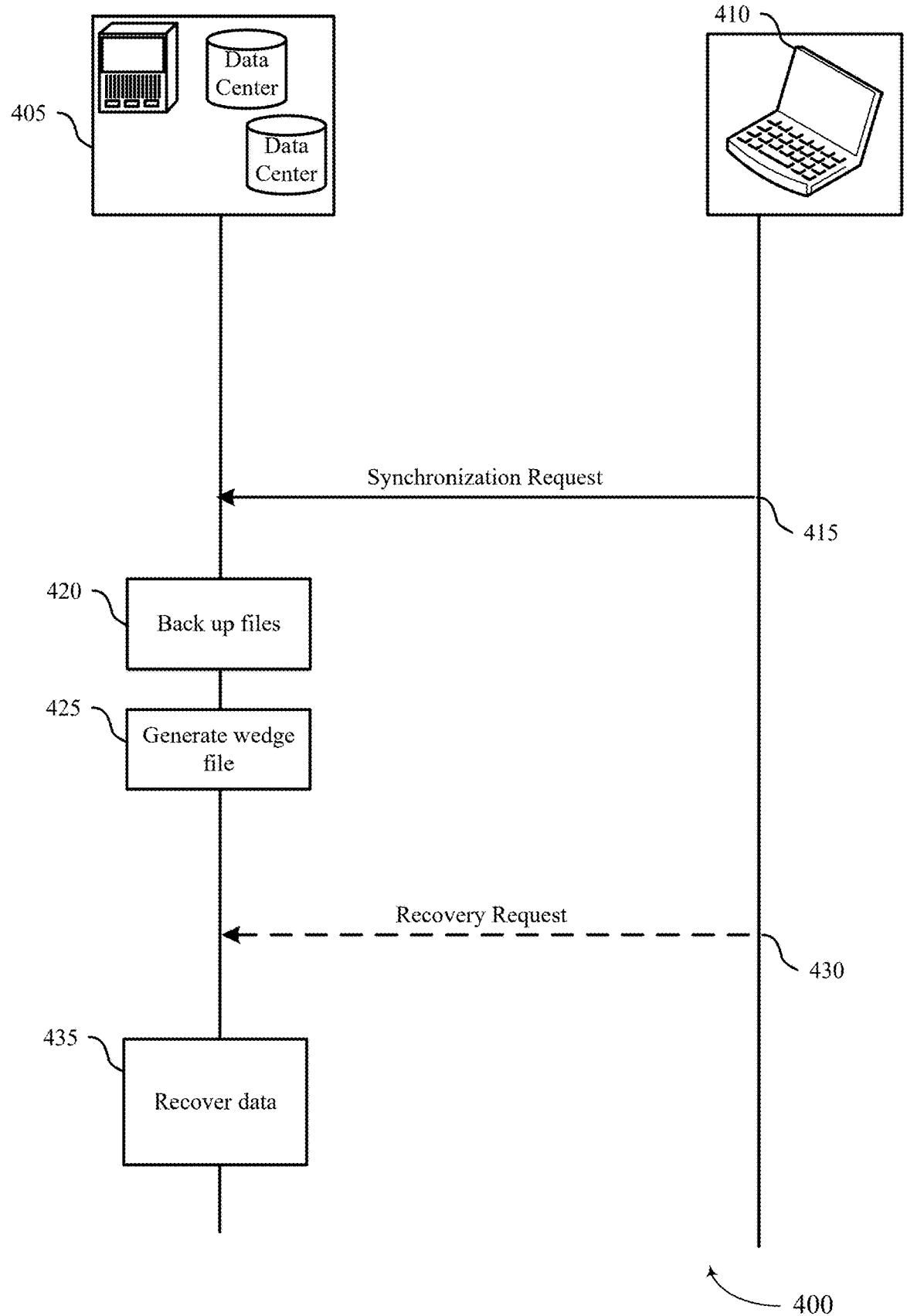
FIG. 4 shows an example of a process flow that supports techniques to enhance failure tolerance during file synchronization in accordance with aspects of the present disclosure.

FIG. 4 shows an example of a process flow 400 that supports techniques to enhance failure tolerance during file synchronization in accordance with aspects of the present disclosure. The process flow 400 includes a DMS 405 and a user device 410. The DMS 405 may include an application server, one or more data storages (e.g., multiple data centers of a computing cluster) as described with respect to FIGS. 2 and 3. The user device 410 may be an example of a user device as described with respect to FIGS. 2 and 3. Although a single entity is depicted as DMS 405, it may be understood that components of the DMS 405 may be located in different locations.

In some examples, the operations illustrated in the process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 415, the DMS 405 may receive a synchronization request to back up a set of files from a source database to a target database including a set of nodes. In some cases, each node of the set of nodes of the target database may support storage of a set of data stripes. In some cases, a data stripe of the set of data stripes may include a logical subdivision of a file from the set of files.

At 420, the DMS 405 may back up the set of files to the target database based on storing the set of data stripes in a set of data chunks. In some cases, the data stripe may include one or more data chunks stored in each node of the set of nodes, and a data wedge may represent a cross section of data across multiple data chunks of a corresponding data stripe.

At 425, the DMS 405 may determine that a most recent data wedge is incompletely filled at a time corresponding to receiving the synchronization request. In such cases, the DMS 405 may generate a file including an indication of one or more data stripes corresponding to the set of files based on determining that the most recent data wedge is incompletely filled at the time corresponding to receiving the synchronization request.

At 430, the DMS 405 may optionally receive a recovery request after generating the file including the indication of one or more data stripes corresponding to the set of files. At 435, the DMS 405 may recover the set of files from the code chunk and the file based on receiving the recovery request.

Figure 5:
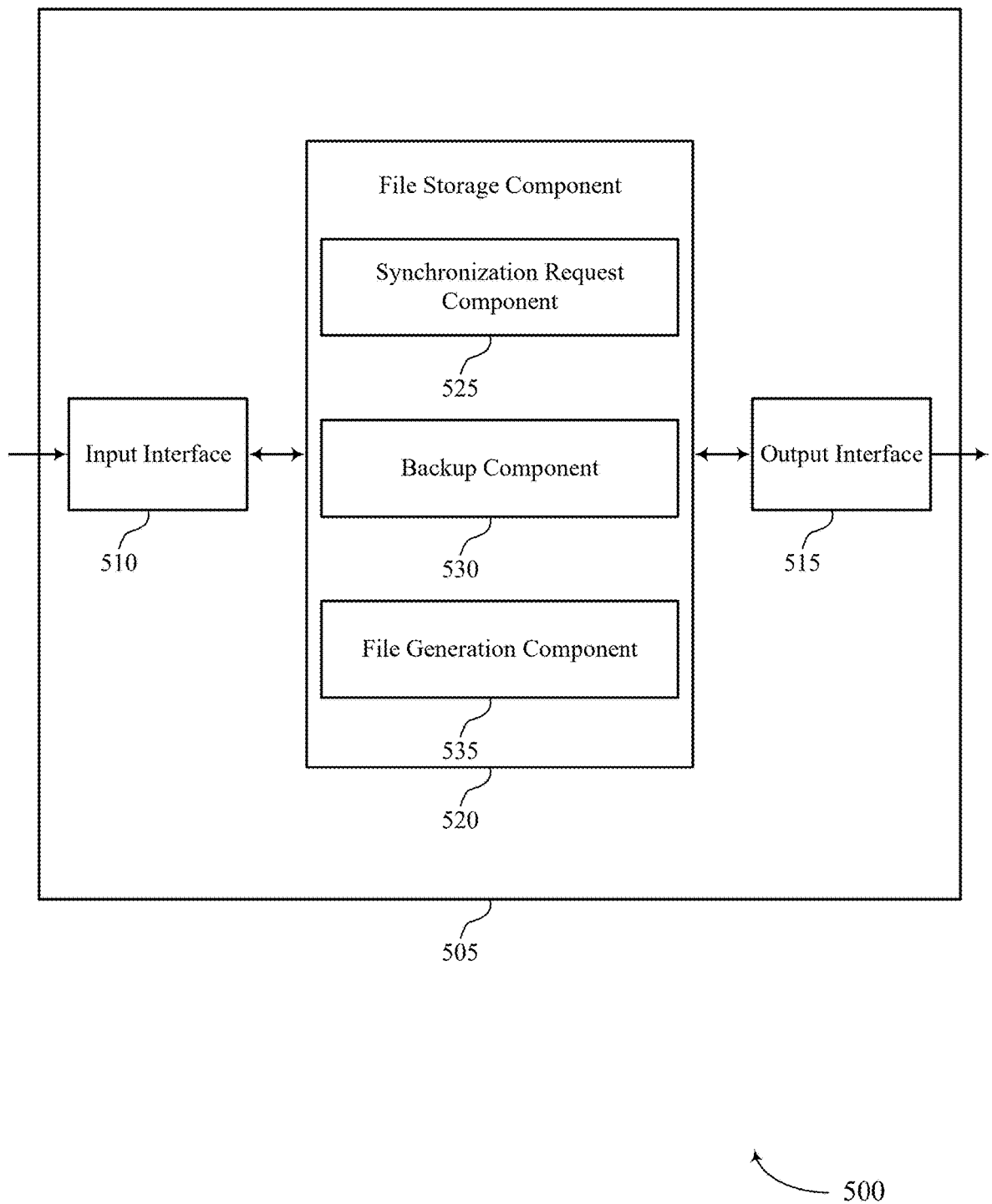
FIG. 5 shows a block diagram of an apparatus that supports techniques to enhance failure tolerance during file synchronization in accordance with aspects of the present disclosure.

FIG. 5 shows a block diagram 500 of a system 505 that supports techniques to enhance failure tolerance during file synchronization in accordance with aspects of the present disclosure. In some examples, the system 505 may be an example of aspects of one or more components described with reference to FIG. 1, such as a DMS 110. The system 505 may include an input interface 510, an output interface 515, and a file storage component 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the file storage component 520 to support techniques to enhance failure tolerance during file synchronization. In some cases, the input interface 510 may be a component of a network interface 725 as described with reference to FIG. 7.

The output interface 515 may manage output signaling for the system 505. For example, the output interface 515 may receive signaling from other components of the system 505, such as the file storage component 520, and may transmit such output signaling corresponding to (e.g., representative of or otherwise based on) such signaling to other systems or devices. In some cases, the output interface 515 may be a component of a network interface 725 as described with reference to FIG. 7.

For example, the file storage component 520 may include a synchronization request component 525, a backup component 530, a file generation component 535, or any combination thereof. In some examples, the file storage component 520, or various components thereof, may be configured to perform various operations (e.g., receiving, monitoring, transmitting) using or otherwise in cooperation with the input interface 510, the output interface 515, or both. For example, the file storage component 520 may receive information from the input interface 510, send information to the output interface 515, or be integrated in combination with the input interface 510, the output interface 515, or both to receive information, transmit information, or perform various other operations as described herein.

The synchronization request component 525 may be configured as or otherwise support a means for receiving a synchronization request to back up a set of multiple files from a source database to a target database including a set of nodes, where each node of the set of nodes of the target database supports storage of a set of multiple data stripes, and where a data stripe of the set of multiple data stripes includes a logical subdivision of a file from the set of multiple files. The backup component 530 may be configured as or otherwise support a means for backing up the set of multiple files to the target database based on storing the set of multiple data stripes in a set of multiple data chunks, where the data stripe includes one or more data chunks stored in each node of the set of nodes, and where a data wedge represents a cross section of data across multiple data chunks of a corresponding data stripe. The backup component 530 may be configured as or otherwise support a means for determining that a most recent data wedge is incompletely filled at a time corresponding to receiving the synchronization request. The file generation component 535 may be configured as or otherwise support a means for generating a file including an indication of one or more data stripes corresponding to the set of multiple files based on determining that the most recent data wedge is incompletely filled at the time corresponding to receiving the synchronization request.

Figure 6:
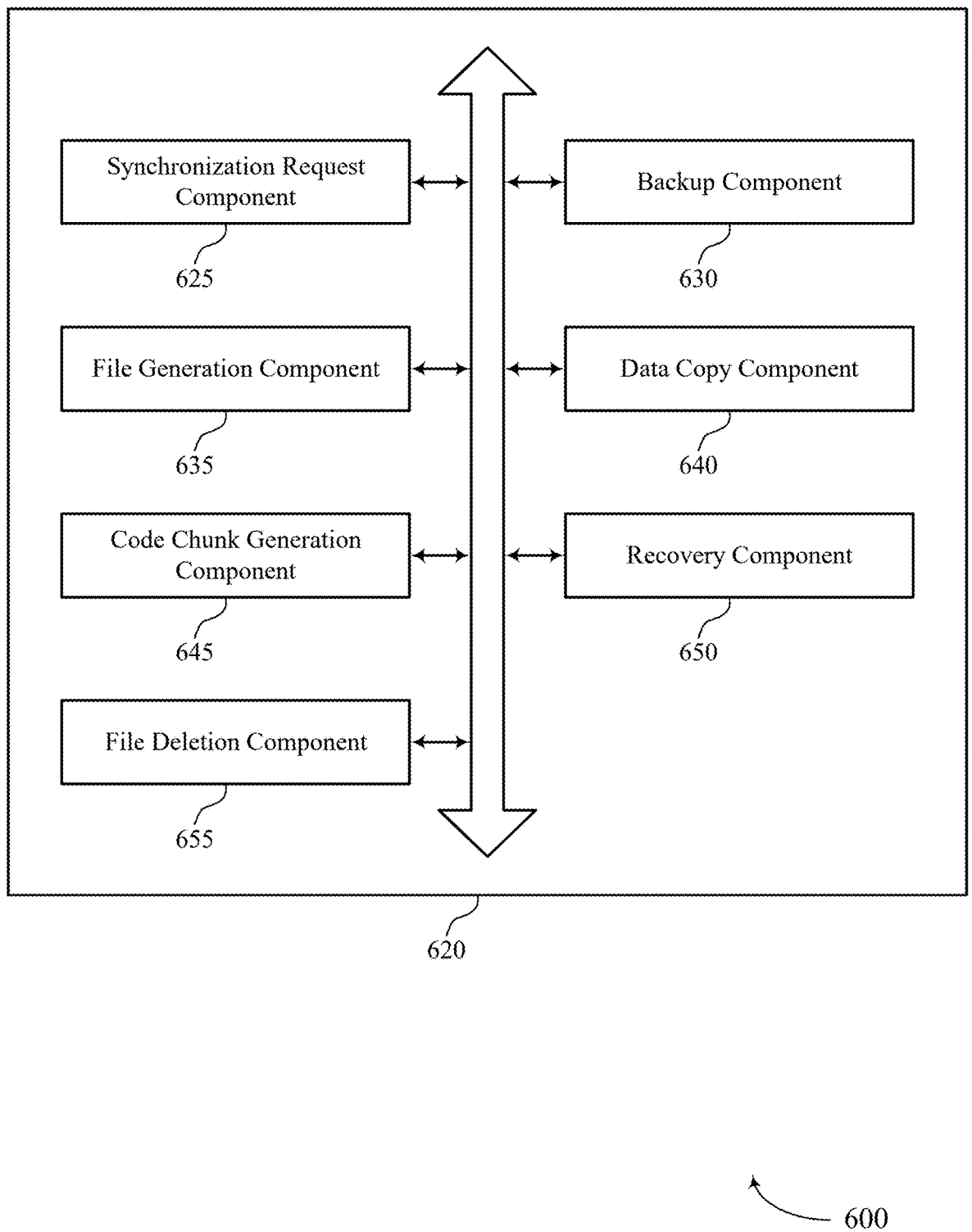
FIG. 6 shows a block diagram of a file storage component that supports techniques to enhance failure tolerance during file synchronization in accordance with aspects of the present disclosure.

FIG. 6 shows a block diagram 600 of a file storage component 620 that supports techniques to enhance failure tolerance during file synchronization in accordance with aspects of the present disclosure. The file storage component 620 may be an example of aspects of a file storage component 520, or both, as described herein. The file storage component 620, or various components thereof, may be an example of means for performing various aspects of techniques to enhance failure tolerance during file synchronization as described herein. For example, the file storage component 620 may include a synchronization request component 625, a backup component 630, a file generation component 635, a data copy component 640, a code chunk generation component 645, a recovery component 650, a file deletion component 655, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The synchronization request component 625 may be configured as or otherwise support a means for receiving a synchronization request to back up a set of multiple files from a source database to a target database including a set of nodes, where each node of the set of nodes of the target database supports storage of a set of multiple data stripes, and where a data stripe of the set of multiple data stripes includes a logical subdivision of a file from the set of multiple files. The backup component 630 may be configured as or otherwise support a means for backing up the set of multiple files to the target database based on storing the set of multiple data stripes in a set of multiple data chunks, where the data stripe includes one or more data chunks stored in each node of the set of nodes, and where a data wedge represents a cross section of data across multiple data chunks of a corresponding data stripe. In some examples, the backup component 630 may be configured as or otherwise support a means for determining that a most recent data wedge is incompletely filled at a time corresponding to receiving the synchronization request. The file generation component 635 may be configured as or otherwise support a means for generating a file including an indication of one or more data stripes corresponding to the set of multiple files based on determining that the most recent data wedge is incompletely filled at the time corresponding to receiving the synchronization request.

In some examples, the file generation component 635 may be configured as or otherwise support a means for generating a second file including the indication of the one or more data stripes corresponding to the set of multiple files based on determining that the most recent data wedge is incompletely filled at a time corresponding to receiving the synchronization request.

In some examples, to support generating the file, the data copy component 640 may be configured as or otherwise support a means for storing a copy of the most recent data wedge in the file, the copy of the most recent data wedge including the one or more data stripes corresponding to the set of multiple files.

In some examples, the backup component 630 may be configured as or otherwise support a means for determining that a prior data wedge is completely filled at the time corresponding to receiving the synchronization request. In some examples, the code chunk generation component 645 may be configured as or otherwise support a means for generating a code chunk including an indication corresponding to the prior data wedge based on determining that the prior data wedge is completely filled at the time corresponding to receiving the synchronization request.

In some examples, the recovery component 650 may be configured as or otherwise support a means for receiving a recovery request after generating the file including the indication of one or more data stripes corresponding to the set of multiple files.

In some examples, the recovery component 650 may be configured as or otherwise support a means for recovering the set of multiple files from the code chunk and the file based on receiving the recovery request. In some examples, the code chunk and the file are co-located on a storage disk.

In some examples, the synchronization request component 625 may be configured as or otherwise support a means for receiving a second synchronization request to back up a second set of multiple files from the source database to the target database. In some examples, the backup component 630 may be configured as or otherwise support a means for determining that the most recent data wedge is completely filled at a time corresponding to receiving the second synchronization request.

In some examples, the file deletion component 655 may be configured as or otherwise support a means for deleting the file including the indication of the one or more data stripes corresponding to the set of multiple files based on determining that the most recent data wedge is completely filled at the time corresponding to receiving the second synchronization request.

Figure 7:
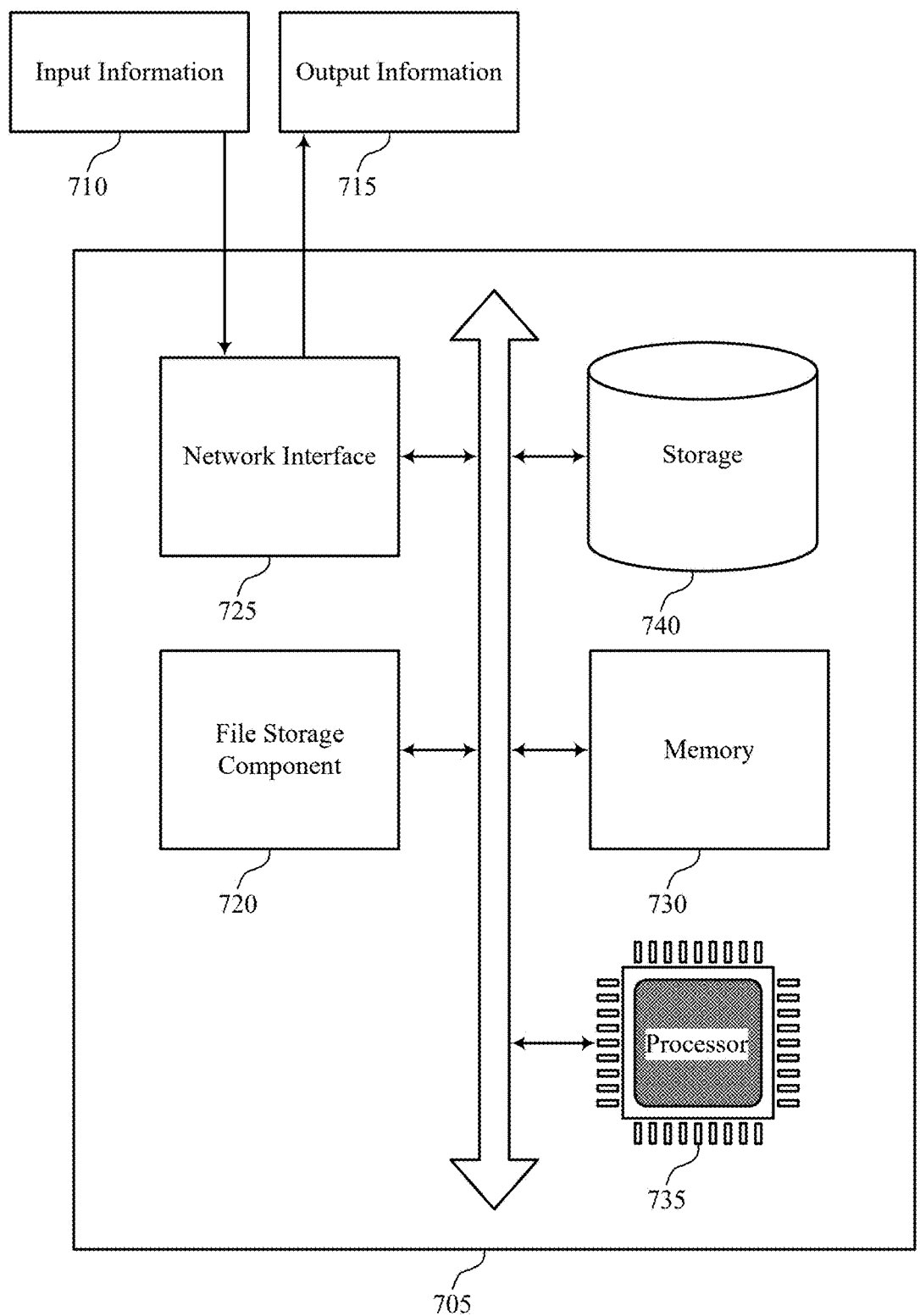
FIG. 7 shows a diagram of a system including a device that supports techniques to enhance failure tolerance during file synchronization in accordance with aspects of the present disclosure.

FIG. 7 shows a block diagram 700 of a system 705 that supports techniques to enhance failure tolerance during file synchronization in accordance with aspects of the present disclosure. The system 705 may be an example of or include components of a system 505 as described herein. The system 705 may include components for data management, including components such as a file storage component 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting techniques to enhance failure tolerance during file synchronization). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the file storage component 720 may be configured as or otherwise support a means for receiving a synchronization request to back up a set of multiple files from a source database to a target database including a set of nodes, where each node of the set of nodes of the target database supports storage of a set of multiple data stripes, and where a data stripe of the set of multiple data stripes includes a logical subdivision of a file from the set of multiple files. The file storage component 720 may be configured as or otherwise support a means for backing up the set of multiple files to the target database based on storing the set of multiple data stripes in a set of multiple data chunks, where the data stripe includes one or more data chunks stored in each node of the set of nodes, and where a data wedge represents a cross section of data across multiple data chunks of a corresponding data stripe. The file storage component 720 may be configured as or otherwise support a means for determining that a most recent data wedge is incompletely filled at a time corresponding to receiving the synchronization request. The file storage component 720 may be configured as or otherwise support a means for generating a file including an indication of one or more data stripes corresponding to the set of multiple files based on determining that the most recent data wedge is incompletely filled at the time corresponding to receiving the synchronization request.

By including or configuring the file storage component 720 in accordance with examples as described herein, the system 705 may support techniques for techniques to enhance failure tolerance during file synchronization, which may provide one or more benefits such as, for example, improved reliability, reduced latency, improved user experience, reduced power consumption, and more efficient utilization of computing resources, network resources or both, among other possibilities.

Figure 8:
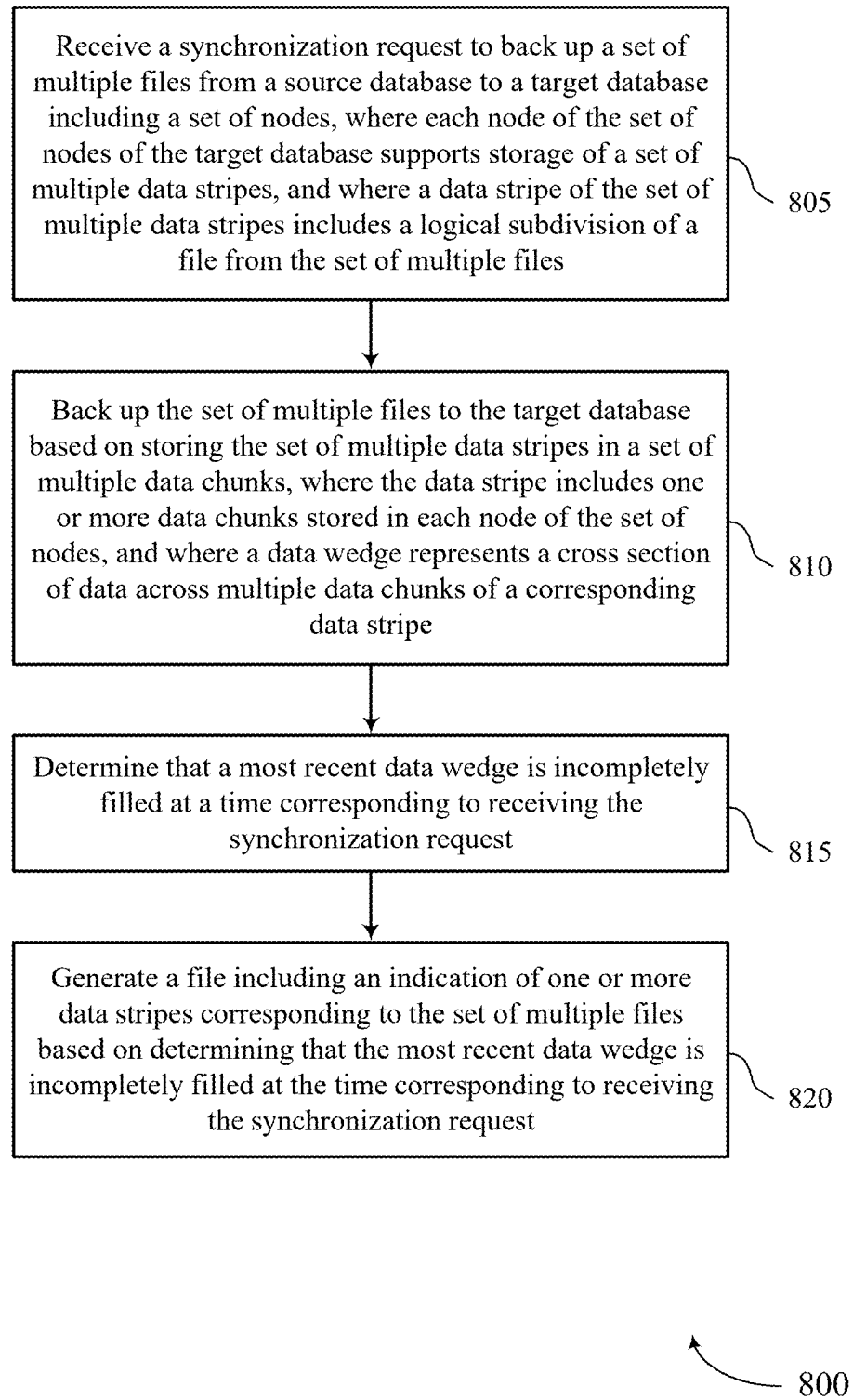
FIGS. 8 through 11 show flowcharts illustrating methods that support techniques to enhance failure tolerance during file synchronization in accordance with aspects of the present disclosure.

FIG. 8 shows a flowchart illustrating a method 800 that supports techniques to enhance failure tolerance during file synchronization in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include receiving a synchronization request to back up a set of multiple files from a source database to a target database including a set of nodes, where each node of the set of nodes of the target database supports storage of a set of multiple data stripes, and where a data stripe of the set of multiple data stripes includes a logical subdivision of a file from the set of multiple files. The operations of 805 may be performed in accordance with examples as disclosed herein. In some examples, aspects of the operations of 805 may be performed by a synchronization request component 625 as described with reference to FIG. 6.

At 810, the method may include backing up the set of multiple files to the target database based on storing the set of multiple data stripes in a set of multiple data chunks, where the data stripe includes one or more data chunks stored in each node of the set of nodes, and where a data wedge represents a cross section of data across multiple data chunks of a corresponding data stripe. The operations of 810 may be performed in accordance with examples as disclosed herein. In some examples, aspects of the operations of 810 may be performed by a backup component 630 as described with reference to FIG. 6.

At 815, the method may include determining that a most recent data wedge is incompletely filled at a time corresponding to receiving the synchronization request. The operations of 815 may be performed in accordance with examples as disclosed herein. In some examples, aspects of the operations of 815 may be performed by a backup component 630 as described with reference to FIG. 6.

At 820, the method may include generating a file including an indication of one or more data stripes corresponding to the set of multiple files based on determining that the most recent data wedge is incompletely filled at the time corresponding to receiving the synchronization request. The operations of 820 may be performed in accordance with examples as disclosed herein. In some examples, aspects of the operations of 820 may be performed by a file generation component 635 as described with reference to FIG. 6.

Figure 9:
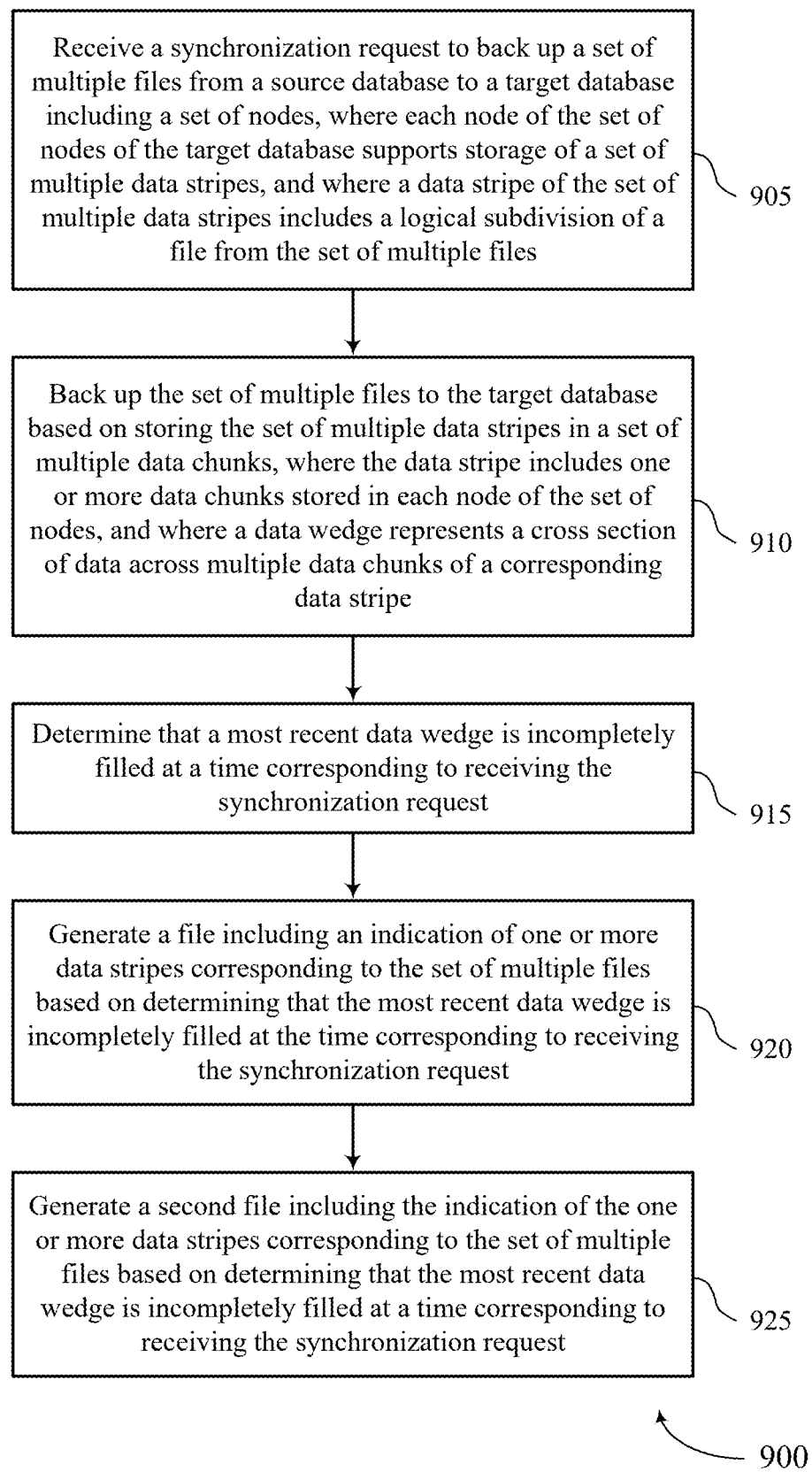

FIG. 9 shows a flowchart illustrating a method 900 that supports techniques to enhance failure tolerance during file synchronization in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include receiving a synchronization request to back up a set of multiple files from a source database to a target database including a set of nodes, where each node of the set of nodes of the target database supports storage of a set of multiple data stripes, and where a data stripe of the set of multiple data stripes includes a logical subdivision of a file from the set of multiple files. The operations of 905 may be performed in accordance with examples as disclosed herein. In some examples, aspects of the operations of 905 may be performed by a synchronization request component 625 as described with reference to FIG. 6.

At 910, the method may include backing up the set of multiple files to the target database based on storing the set of multiple data stripes in a set of multiple data chunks, where the data stripe includes one or more data chunks stored in each node of the set of nodes, and where a data wedge represents a cross section of data across multiple data chunks of a corresponding data stripe. The operations of 910 may be performed in accordance with examples as disclosed herein. In some examples, aspects of the operations of 910 may be performed by a backup component 630 as described with reference to FIG. 6.

At 915, the method may include determining that a most recent data wedge is incompletely filled at a time corresponding to receiving the synchronization request. The operations of 915 may be performed in accordance with examples as disclosed herein. In some examples, aspects of the operations of 915 may be performed by a backup component 630 as described with reference to FIG. 6.

At 920, the method may include generating a file including an indication of one or more data stripes corresponding to the set of multiple files based on determining that the most recent data wedge is incompletely filled at the time corresponding to receiving the synchronization request. The operations of 920 may be performed in accordance with examples as disclosed herein. In some examples, aspects of the operations of 920 may be performed by a file generation component 635 as described with reference to FIG. 6.

At 925, the method may include generating a second file including the indication of the one or more data stripes corresponding to the set of multiple files based on determining that the most recent data wedge is incompletely filled at a time corresponding to receiving the synchronization request. The operations of 925 may be performed in accordance with examples as disclosed herein. In some examples, aspects of the operations of 925 may be performed by a file generation component 635 as described with reference to FIG. 6.

Figure 10:
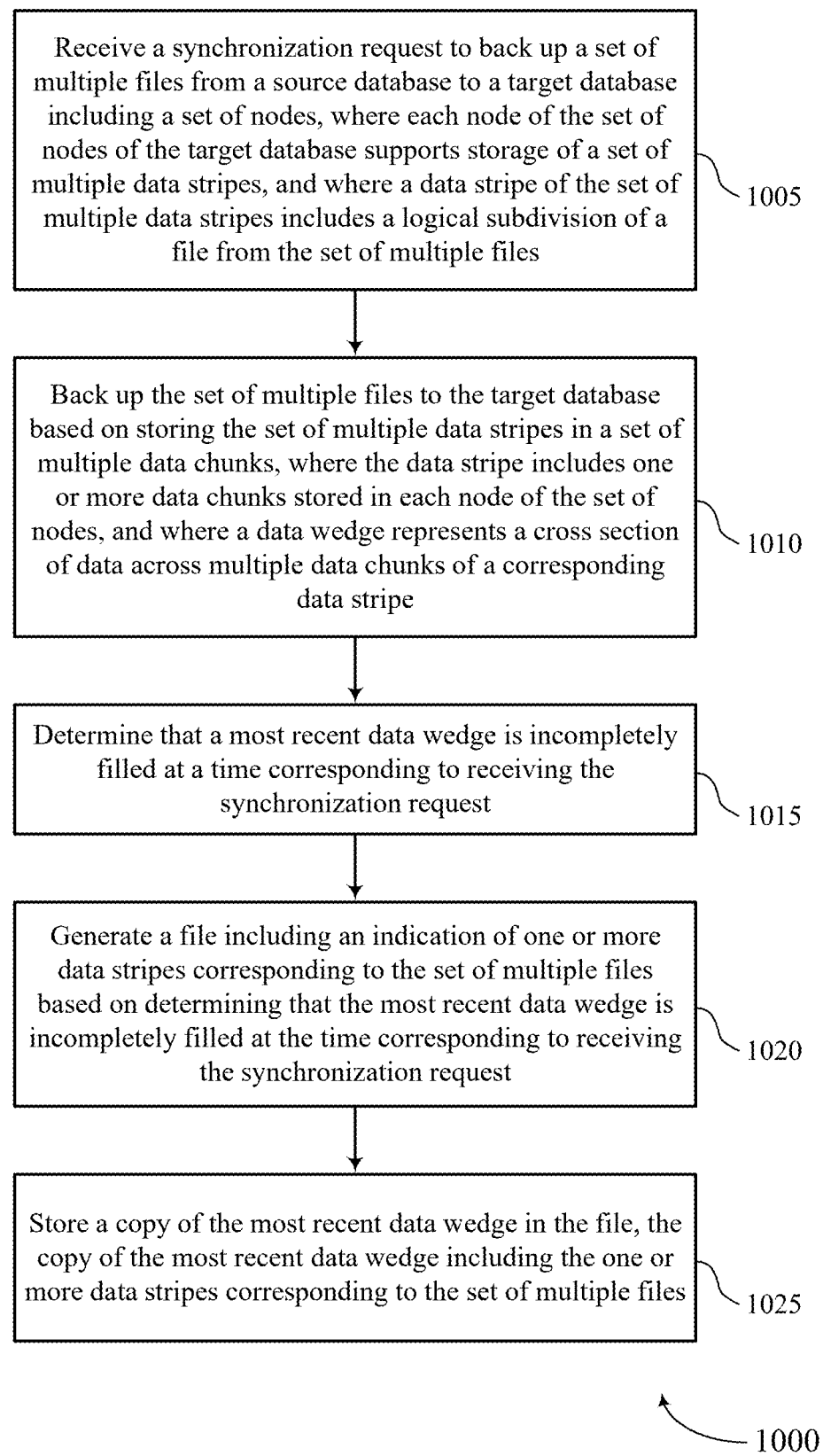

FIG. 10 shows a flowchart illustrating a method 1000 that supports techniques to enhance failure tolerance during file synchronization in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include receiving a synchronization request to back up a set of multiple files from a source database to a target database including a set of nodes, where each node of the set of nodes of the target database supports storage of a set of multiple data stripes, and where a data stripe of the set of multiple data stripes includes a logical subdivision of a file from the set of multiple files. The operations of 1005 may be performed in accordance with examples as disclosed herein. In some examples, aspects of the operations of 1005 may be performed by a synchronization request component 625 as described with reference to FIG. 6.

At 1010, the method may include backing up the set of multiple files to the target database based on storing the set of multiple data stripes in a set of multiple data chunks, where the data stripe includes one or more data chunks stored in each node of the set of nodes, and where a data wedge represents a cross section of data across multiple data chunks of a corresponding data stripe. The operations of 1010 may be performed in accordance with examples as disclosed herein. In some examples, aspects of the operations of 1010 may be performed by a backup component 630 as described with reference to FIG. 6.

At 1015, the method may include determining that a most recent data wedge is incompletely filled at a time corresponding to receiving the synchronization request. The operations of 1015 may be performed in accordance with examples as disclosed herein. In some examples, aspects of the operations of 1015 may be performed by a backup component 630 as described with reference to FIG. 6.

At 1020, the method may include generating a file including an indication of one or more data stripes corresponding to the set of multiple files based on determining that the most recent data wedge is incompletely filled at the time corresponding to receiving the synchronization request. The operations of 1020 may be performed in accordance with examples as disclosed herein. In some examples, aspects of the operations of 1020 may be performed by a file generation component 635 as described with reference to FIG. 6.

At 1025, the method may include storing a copy of the most recent data wedge in the file, the copy of the most recent data wedge including the one or more data stripes corresponding to the set of multiple files. The operations of 1025 may be performed in accordance with examples as disclosed herein. In some examples, aspects of the operations of 1025 may be performed by a data copy component 640 as described with reference to FIG. 6.

Figure 11:
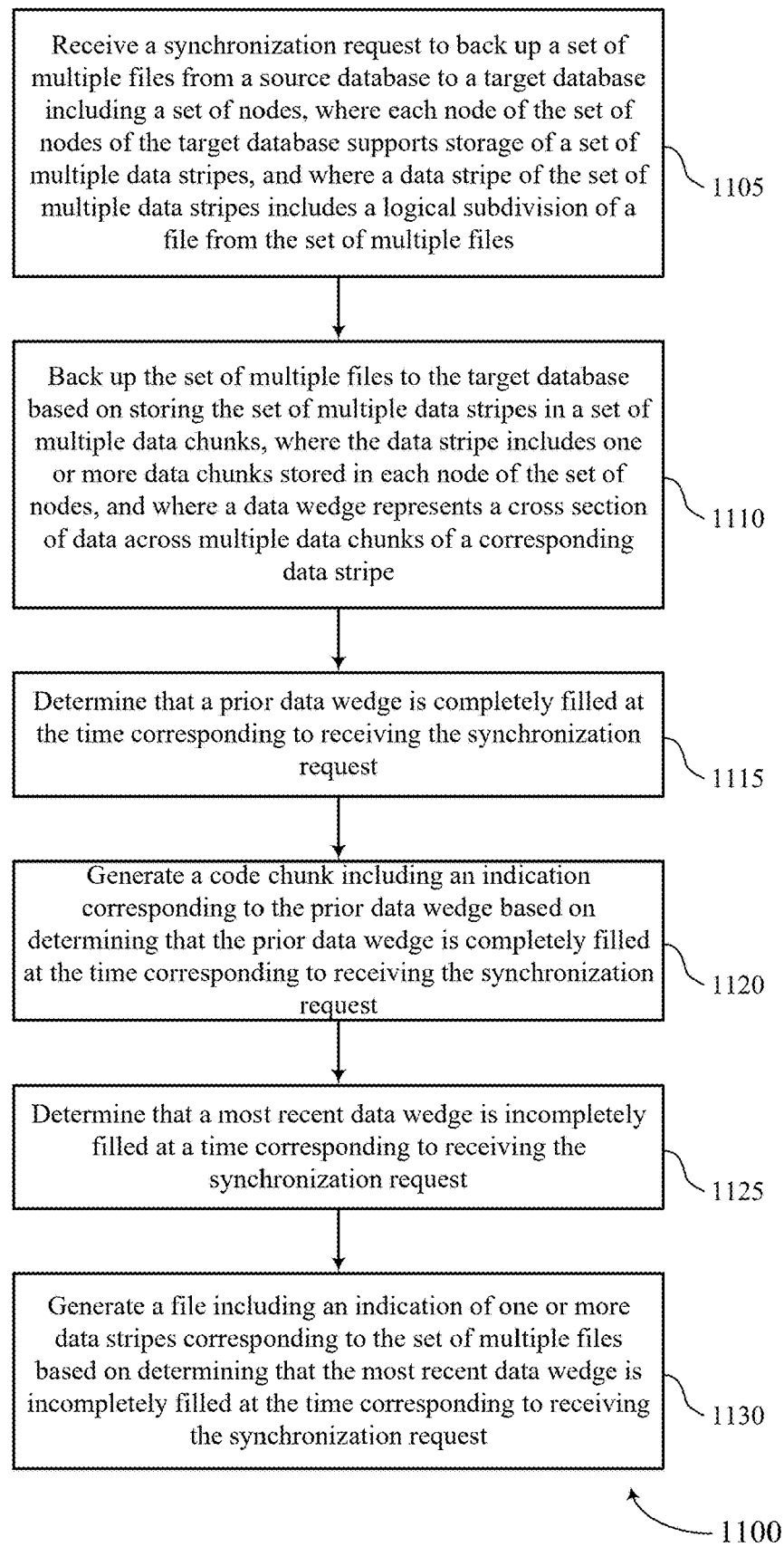

FIG. 11 shows a flowchart illustrating a method 1100 that supports techniques to enhance failure tolerance during file synchronization in accordance with aspects of the present disclosure. The operations of the method 1100 may be implemented by a DMS or its components as described herein. For example, the operations of the method 1100 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1105, the method may include receiving a synchronization request to back up a set of multiple files from a source database to a target database including a set of nodes, where each node of the set of nodes of the target database supports storage of a set of multiple data stripes, and where a data stripe of the set of multiple data stripes includes a logical subdivision of a file from the set of multiple files. The operations of 1105 may be performed in accordance with examples as disclosed herein. In some examples, aspects of the operations of 1105 may be performed by a synchronization request component 625 as described with reference to FIG. 6.

At 1110, the method may include backing up the set of multiple files to the target database based on storing the set of multiple data stripes in a set of multiple data chunks, where the data stripe includes one or more data chunks stored in each node of the set of nodes, and where a data wedge represents a cross section of data across multiple data chunks of a corresponding data stripe. The operations of 1110 may be performed in accordance with examples as disclosed herein. In some examples, aspects of the operations of 1110 may be performed by a backup component 630 as described with reference to FIG. 6.

At 1115, the method may include determining that a prior data wedge is completely filled at the time corresponding to receiving the synchronization request. The operations of 1115 may be performed in accordance with examples as disclosed herein. In some examples, aspects of the operations of 1115 may be performed by a backup component 630 as described with reference to FIG. 6.

At 1120, the method may include generating a code chunk including an indication corresponding to the prior data wedge based on determining that the prior data wedge is completely filled at the time corresponding to receiving the synchronization request. The operations of 1120 may be performed in accordance with examples as disclosed herein. In some examples, aspects of the operations of 1120 may be performed by a code chunk generation component 645 as described with reference to FIG. 6.

At 1125, the method may include determining that a most recent data wedge is incompletely filled at a time corresponding to receiving the synchronization request. The operations of 1125 may be performed in accordance with examples as disclosed herein. In some examples, aspects of the operations of 1125 may be performed by a backup component 630 as described with reference to FIG. 6.

At 1130, the method may include generating a file including an indication of one or more data stripes corresponding to the set of multiple files based on determining that the most recent data wedge is incompletely filled at the time corresponding to receiving the synchronization request. The operations of 1130 may be performed in accordance with examples as disclosed herein. In some examples, aspects of the operations of 1130 may be performed by a file generation component 635 as described with reference to FIG. 6.

A method by an apparatus is described. The method may include receiving a synchronization request to back up a set of multiple files from a source database to a target database including a set of nodes, where each node of the set of nodes of the target database supports storage of a set of multiple data stripes, and where a data stripe of the set of multiple data stripes includes a logical subdivision of a file from the set of multiple files, backing up the set of multiple files to the target database based on storing the set of multiple data stripes in a set of multiple data chunks, where the data stripe includes one or more data chunks stored in each node of the set of nodes, and where a data wedge represents a cross section of data across multiple data chunks of a corresponding data stripe, determining that a most recent data wedge is incompletely filled at a time corresponding to receiving the synchronization request, and generating a file including an indication of one or more data stripes corresponding to the set of multiple files based on determining that the most recent data wedge is incompletely filled at the time corresponding to receiving the synchronization request.

An apparatus is described. The apparatus may include one or more memories storing processor executable code, and one or more processors coupled with the one or more memories. The one or more processors may individually or collectively be operable to execute the code to cause the apparatus to receive a synchronization request to back up a set of multiple files from a source database to a target database including a set of nodes, where each node of the set of nodes of the target database supports storage of a set of multiple data stripes, and where a data stripe of the set of multiple data stripes includes a logical subdivision of a file from the set of multiple files, back up the set of multiple files to the target database based on storing the set of multiple data stripes in a set of multiple data chunks, where the data stripe includes one or more data chunks stored in each node of the set of nodes, and where a data wedge represents a cross section of data across multiple data chunks of a corresponding data stripe, determine that a most recent data wedge is incompletely filled at a time corresponding to receiving the synchronization request, and generate a file including an indication of one or more data stripes corresponding to the set of multiple files based on determining that the most recent data wedge is incompletely filled at the time corresponding to receiving the synchronization request.

Another apparatus is described. The apparatus may include means for receiving a synchronization request to back up a set of multiple files from a source database to a target database including a set of nodes, where each node of the set of nodes of the target database supports storage of a set of multiple data stripes, and where a data stripe of the set of multiple data stripes includes a logical subdivision of a file from the set of multiple files, means for backing up the set of multiple files to the target database based on storing the set of multiple data stripes in a set of multiple data chunks, where the data stripe includes one or more data chunks stored in each node of the set of nodes, and where a data wedge represents a cross section of data across multiple data chunks of a corresponding data stripe, means for determining that a most recent data wedge is incompletely filled at a time corresponding to receiving the synchronization request, and means for generating a file including an indication of one or more data stripes corresponding to the set of multiple files based on determining that the most recent data wedge is incompletely filled at the time corresponding to receiving the synchronization request.

A non-transitory computer-readable medium storing code is described. The code may include instructions executable by one or more processors to receive a synchronization request to back up a set of multiple files from a source database to a target database including a set of nodes, where each node of the set of nodes of the target database supports storage of a set of multiple data stripes, and where a data stripe of the set of multiple data stripes includes a logical subdivision of a file from the set of multiple files, back up the set of multiple files to the target database based on storing the set of multiple data stripes in a set of multiple data chunks, where the data stripe includes one or more data chunks stored in each node of the set of nodes, and where a data wedge represents a cross section of data across multiple data chunks of a corresponding data stripe, determine that a most recent data wedge is incompletely filled at a time corresponding to receiving the synchronization request, and generate a file including an indication of one or more data stripes corresponding to the set of multiple files based on determining that the most recent data wedge is incompletely filled at the time corresponding to receiving the synchronization request.

Some examples of the method, apparatus, and non-transitory computer-readable medium described herein may further include operations, features, means, or instructions for generating a second file including the indication of the one or more data stripes corresponding to the set of multiple files based on determining that the most recent data wedge may be incompletely filled at a time corresponding to receiving the synchronization request.

In some examples of the method, apparatus, and non-transitory computer-readable medium described herein, generating the file may include operations, features, means, or instructions for storing a copy of the most recent data wedge in the file, the copy of the most recent data wedge including the one or more data stripes corresponding to the set of multiple files.

Some examples of the method, apparatus, and non-transitory computer-readable medium described herein may further include operations, features, means, or instructions for determining that a prior data wedge may be completely filled at the time corresponding to receiving the synchronization request and generating a code chunk including an indication corresponding to the prior data wedge based on determining that the prior data wedge may be completely filled at the time corresponding to receiving the synchronization request.

Some examples of the method, apparatus, and non-transitory computer-readable medium described herein may further include operations, features, means, or instructions for receiving a recovery request after generating the file including the indication of one or more data stripes corresponding to the set of multiple files.

Some examples of the method, apparatus, and non-transitory computer-readable medium described herein may further include operations, features, means, or instructions for recovering the set of multiple files from the code chunk and the file based on receiving the recovery request.

In some examples of the method, apparatus, and non-transitory computer-readable medium described herein, the code chunk and the file may be co-located on a storage disk.

Some examples of the method, apparatus, and non-transitory computer-readable medium described herein may further include operations, features, means, or instructions for receiving a second synchronization request to back up a second set of multiple files from the source database to the target database and determining that the most recent data wedge may be completely filled at a time corresponding to receiving the second synchronization request.

Some examples of the method, apparatus, and non-transitory computer-readable medium described herein may further include operations, features, means, or instructions for deleting the file including the indication of the one or more data stripes corresponding to the set of multiple files based on determining that the most recent data wedge may be completely filled at the time corresponding to receiving the second synchronization request.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method comprising:
    receiving a synchronization request to back up a plurality of files from a source database to a target database comprising a set of nodes, wherein each node of the set of nodes of the target database supports storage of a plurality of data stripes, and wherein a data stripe of the plurality of data stripes comprises a logical subdivision of a file from the plurality of files;
    backing up the plurality of files to the target database based at least in part on storing the plurality of data stripes in a plurality of data chunks, wherein the data stripe comprises one or more data chunks stored in each node of the set of nodes, and wherein a data wedge represents a cross section of data across multiple data chunks of a corresponding data stripe;
    determining that a most recent data wedge is incompletely filled at a time corresponding to receiving the synchronization request; and
    generating a file comprising an indication of one or more data stripes corresponding to the plurality of files based at least in part on determining that the most recent data wedge is incompletely filled at the time corresponding to receiving the synchronization request.

2. The method of claim 1, further comprising:
    generating a second file comprising the indication of the one or more data stripes corresponding to the plurality of files based at least in part on determining that the most recent data wedge is incompletely filled at the time corresponding to receiving the synchronization request.

3. The method of claim 1, wherein generating the file further comprises:
    storing a copy of the most recent data wedge in the file, the copy of the most recent data wedge comprising the one or more data stripes corresponding to the plurality of files.

4. The method of claim 1, further comprising:
    determining that a prior data wedge is completely filled at the time corresponding to receiving the synchronization request; and
    generating a code chunk comprising an indication corresponding to the prior data wedge based at least in part on determining that the prior data wedge is completely filled at the time corresponding to receiving the synchronization request.

5. The method of claim 4, further comprising:
    receiving a recovery request after generating the file comprising the indication of the one or more data stripes corresponding to the plurality of files.

6. The method of claim 5, further comprising:
    recovering the plurality of files from the code chunk and the file based at least in part on receiving the recovery request.

7. The method of claim 4, wherein the code chunk and the file are co-located on a storage disk.

8. The method of claim 1, further comprising:
    receiving a second synchronization request to back up a second plurality of files from the source database to the target database; and
    determining that the most recent data wedge is completely filled at a time corresponding to receiving the second synchronization request.

9. The method of claim 8, further comprising:
    deleting the file comprising the indication of the one or more data stripes corresponding to the plurality of files based at least in part on determining that the most recent data wedge is completely filled at the time corresponding to receiving the second synchronization request.

10. An apparatus, comprising:
    one or more memories storing processor-executable code; and
    one or more processors coupled with the one or more memories and individually or collectively operable to execute the code to cause the apparatus to:
        receive a synchronization request to back up a plurality of files from a source database to a target database comprising a set of nodes, wherein each node of the set of nodes of the target database supports storage of a plurality of data stripes, and wherein a data stripe of the plurality of data stripes comprises a logical subdivision of a file from the plurality of files;
        back up the plurality of files to the target database based at least in part on storing the plurality of data stripes in a plurality of data chunks, wherein the data stripe comprises one or more data chunks stored in each node of the set of nodes, and wherein a data wedge represents a cross section of data across multiple data chunks of a corresponding data stripe;
        determine that a most recent data wedge is incompletely filled at a time corresponding to receiving the synchronization request; and
        generate a file comprising an indication of one or more data stripes corresponding to the plurality of files based at least in part on determining that the most recent data wedge is incompletely filled at the time corresponding to receiving the synchronization request.

11. The apparatus of claim 10, wherein the one or more processors are individually or collectively further operable to execute the code to cause the apparatus to:
    generate a second file comprising the indication of the one or more data stripes corresponding to the plurality of files based at least in part on determining that the most recent data wedge is incompletely filled at the time corresponding to receiving the synchronization request.

12. The apparatus of claim 10, wherein, to generate the file, the one or more processors are individually or collectively further operable to execute the code to cause the apparatus to:
store a copy of the most recent data wedge in the file, the copy of the most recent data wedge comprising the one or more data stripes corresponding to the plurality of files.

13. The apparatus of claim 10, wherein the one or more processors are individually or collectively further operable to execute the code to cause the apparatus to:
determine that a prior data wedge is completely filled at the time corresponding to receiving the synchronization request; and
generate a code chunk comprising an indication corresponding to the prior data wedge based at least in part on determining that the prior data wedge is completely filled at the time corresponding to receiving the synchronization request.

14. The apparatus of claim 13, wherein the one or more processors are individually or collectively further operable to execute the code to cause the apparatus to:
receive a recovery request after generating the file comprising the indication of the one or more data stripes corresponding to the plurality of files.

15. The apparatus of claim 14, wherein the one or more processors are individually or collectively further operable to execute the code to cause the apparatus to:
recover the plurality of files from the code chunk and the file based at least in part on receiving the recovery request.

16. The apparatus of claim 13, wherein the code chunk and the file are co-located on a storage disk.

17. The apparatus of claim 10, wherein the one or more processors are individually or collectively further operable to execute the code to cause the apparatus to:
receive a second synchronization request to back up a second plurality of files from the source database to the target database; and
determine that the most recent data wedge is completely filled at a time corresponding to receiving the second synchronization request.

18. The apparatus of claim 17, wherein the one or more processors are individually or collectively further operable to execute the code to cause the apparatus to:
delete the file comprising the indication of the one or more data stripes corresponding to the plurality of files based at least in part on determining that the most recent data wedge is completely filled at the time corresponding to receiving the second synchronization request.

19. A non-transitory computer-readable medium storing code, the code comprising instructions executable by one or more processors to:
receive a synchronization request to back up a plurality of files from a source database to a target database comprising a set of nodes, wherein each node of the set of nodes of the target database supports storage of a plurality of data stripes, and wherein a data stripe of the plurality of data stripes comprises a logical subdivision of a file from the plurality of files;
back up the plurality of files to the target database based at least in part on storing the plurality of data stripes in a plurality of data chunks, wherein the data stripe comprises one or more data chunks stored in each node of the set of nodes, and wherein a data wedge represents a cross section of data across multiple data chunks of a corresponding data stripe;
determine that a most recent data wedge is incompletely filled at a time corresponding to receiving the synchronization request; and
generate a file comprising an indication of one or more data stripes corresponding to the plurality of files based at least in part on determining that the most recent data wedge is incompletely filled at the time corresponding to receiving the synchronization request.

20. The non-transitory computer-readable medium of claim 19, wherein the instructions are further executable by the one or more processors to:
generate a second file comprising the indication of the one or more data stripes corresponding to the plurality of files based at least in part on determining that the most recent data wedge is incompletely filled at the time corresponding to receiving the synchronization request.

* * * * *